Feb. 3, 1970 D. G. BARON ET AL 3,493,858
INFLATABLE PROBE APPARATUS FOR UNIFORMLY
CONTACTING AND TESTING MICROCIRCUITS
Filed Jan. 14, 1966 3 Sheets-Sheet 1
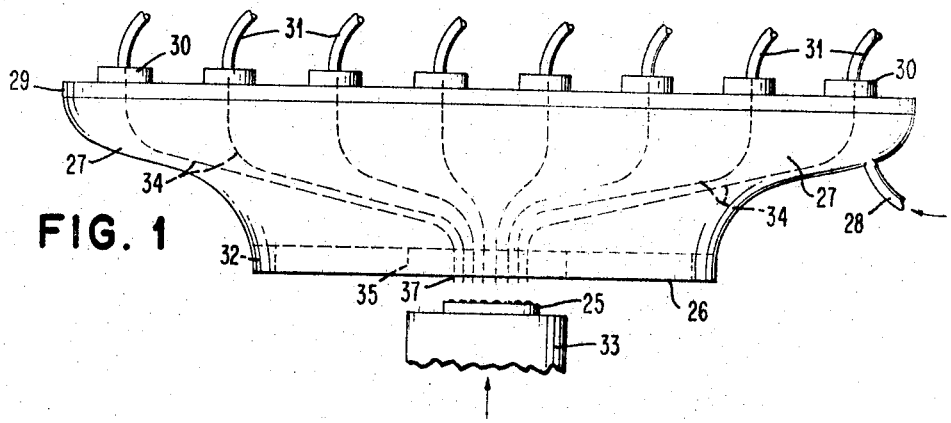
FIG. 1
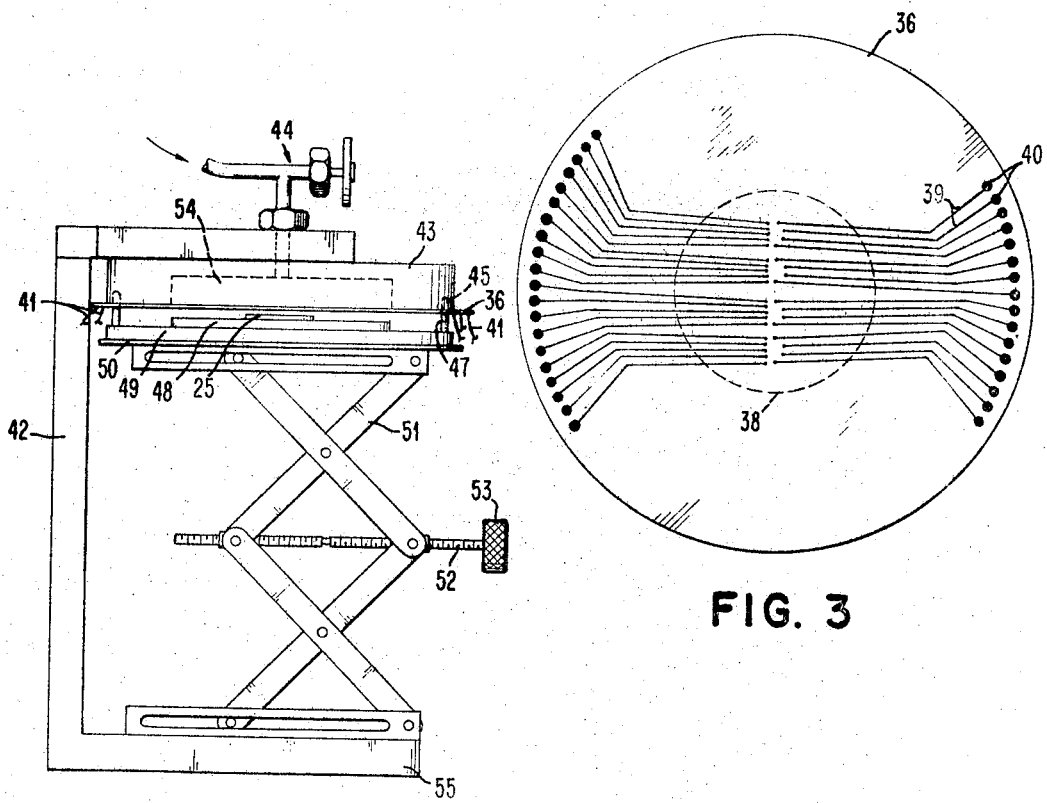
FIG. 2
FIG. 3
INVENTORS
DAVID G. BARON
CARL E. RUOFF
BY
J. W. Armbruster
ATTORNEY ered # United States Patent Office 3,493,858
Patented Feb. 3, 1970

3,493,858
INFLATABLE PROBE APPARATUS FOR UNIFORMLY CONTACTING AND TESTING MICROCIRCUITS
David G. Baron, Yorktown Heights, and Carl E. Ruoff, Apalachin, N.Y., assignors to International Business Machines Corporation, Armonk, N.Y., a corporation of New York
Filed Jan. 14, 1966, Ser. No. 520,791
Int. Cl. G01r 31/02; H02g 15/00
U.S. Cl. 324—72.5         3 Claims

ABSTRACT OF THE DISCLOSURE

A flexible bag stretched over a frame has a series of conductors mounted on the frame. The bag is positioned whereby a portion thereof is disposed parallel to the surface of an element which contains one or more microcircuits, the conductors being arranged with projecting probe points extending from the plane of the bag adjacent to the substrate in a pattern coinciding with the pattern of the terminal areas of the circuit on the element. The bag is adapted to be inflated to move the extending probe points into contact with corresponding terminal areas of the circuitry.

---

This invention relates in general to methods and apparatus for testing microminiature components and circuitry associated therewith, and more specifically for means to probe into multiple arrays of microscopically divided terminals of tiny electronic devices such as diodes and transistors arranged in groups on a small wafer of semiconductive material, or a wafer of insulation in the case of miniaturized circuitry in general.

With the advent of microminiature doped area and film components and integrated circuitry there came the opportunity for batch processing and the economical formation of many small similar diodes, transistors, etc., on one wafer or the production of a series of complicated integrated circuits at the same time on one small substrate. In either event, the advantages of economical, multiple processing in a small area became compounded by the question whether all of the many components of a single unit are good, and how they are to be tested to determine whether they are good, when the terminal areas are in the hundreds and separated from each other by ten thousandths of an inch or less in a microscopic type of setting. Ordinary electromechanical probes are not suited for reaching into the confines of the tiny modern sphere of electornic contractions. The present invention provides several novel expedients for not only reaching into minute terminal spaces but also to do so in a fashion somewhat in the nature of a pneumatic hammer to establish good electrical probe contact by breaking through oxide or dirt films on tiny terminals without fracturing them or shorting the connections between terminals.

Therefore, it is an object of the present invention to provide an improved probe device and method for testing miniaturized components and circuits.

Another object of the invention is to provide a novel pneumatic probe adapted to function in a confined printed circuit test area.

Another object of the invention is to provide a compact test probe head carried on a flexible bag to be expanded by air pressure to firmly and evenly apply probe pressure on circuit terminal areas of electronic devices or circuits to be tested. The application of air pressure affords good regulation according to the type of terminal metal and oxide or other coating film conditions found thereon so that a staccato type of probe impact may be employed when found suited to the occasion. In the use of either slow, firm or staccato application of air pressure to force a probe diaphragm bearing hardened probe tips into contact with circuit terminal metal surfaces such as aluminum, molybdenum or gold, such pressure application is designed to break through any oxide film thereon and establish a good ohmic type contact connection.

Another object of the invention is to provide a novel type of probe device wherein multiple probe pressure is applied very evenly despite the irregularities of a wafer to be tested and the irregularities of the probe material. In the present instance, damage to circuit wafers is avoided because of the firm and evenly distributed probe pressure applied through the pneumatic controls of the present devices.

Another object of the invention is to provide a printed circuit type of probe whereon the contacting probe points or extending terminal areas may be of a minute size and narrowly spaced in order to cooperate with micro-miniaturized integrated circuitry areas which are in effect, mirror images of the overlying probe point arrays. In the present instance, it is proposed that the probe circuitry be borne on a very thin, tough, flexible and transparent plastic such as Mylar which serves to hold the circuit firmly adhered thereto and at the same time be subject to distension for contact by air pressure.

Another object of the invention is to provide a transparent holder for the probe circuitry of a test device. In the present showing, the air controlled plastic bag or diaphragm is made of a transparent plastic which suits it for visual observation of part alignment. The advantage of the use of a transparent probe circuit holder lies in the fact that microscopic observation may be directed through a transparent probe and directly onto the wafer to be tested so that there may be direct adjustment and matching of the terminal positions without the need for use of any registration marks or any alignment pins or other mechanical expedients which could be subject to distortion and possible non-alignment when minute distances are involved. Since a transparent plastic bag or diaphragm holder frame may also be provided with one or more transparent windows as a wall surface, there is the further advantage of providing a study pneumatic device which does not interfere with the direct observation of adjustment when matching probe with circuitry devices.

Another object of the invention is the provision of a probe sheet with fanned-out or radiating conductor wires or printed circuit leads extending from a central probe area, said radiating conductors providing widely spaced ends for terminal connections to outer test indication and recording devices for recording the results of testing to indicate which of the many components or circuits on a wafer are the imperfect ones to be singled out for correction or rejection.

Another object of the invention is the provision of devices and methods for simultaneously probing and sequentially testing a plurality of semiconductor devices on a wafer of minute size, and the circuitry or film devices associated therewith.

Another object of the invention is the provision of devices for simultaneously probing and sequentially testing a plurality of integrated circuit devices on a substrate of minute size and also serially testing several elements of each device whereon the terminals of said circuits are arranged in a microscopically close fashion.

Another object of the invention is the provision of a novel printed circuit art work method especially suited for a probing type of printed circuit whereon critical probe point areas are extended and plated with a hard granular metal, such as rhodium to provide an oxide, dirt or grime breaking probe hammer especially suited for impact in connection with pneumatic probe control.

A further object of the invention is the provision of means for probing and testing a plurality of electronic miniaturized logic devices on a single small wafer area and the testing of the several elements of each logic circuit simultaneously or sequentially according to the nature of the logic element. As an illustration of the testing of a plurality of NOR circuits, it is shown how test pulses are applied in sequence and individually to several active elements of each circuit because of the critical nature of the response desired individually in the actual performance of the device which is verified by the probe testing as performed in the present showing.

Although the invention is illustrated in connection with miniaturized electronic components and circuitry, it is to be understood that components or printed circuit boards of any size are also advantageously subjected to the novel probing and testing methods and apparatus shown.

The foregoing and other objects, features and advantages of the invention will be apparent from the following more particular description of preferred embodiments of the invention, as illustrated in the accompanying drawings.

In the drawings:

FIG. 1 is a side elevation view showing a test apparatus with a plastic bag supported on a frame having upper and lower members around which the lower member carries the portion of the bag having probing conductors suited to come into pneumatically driven contact with a wafer supported on a pedestal.

FIG. 2 is a side elevation of a second modification wherein an adjustable pedestal carries a wafer to be tested which is moved upward into registration with a diaphragm which is suited to be pneumatically driven into probing contact against the wafer.

FIG. 3 is a detailed view showing a diaphragm probe sheet containing the probing printed circuit used in connection with the apparatus shown in FIG. 2.

Figure 4:
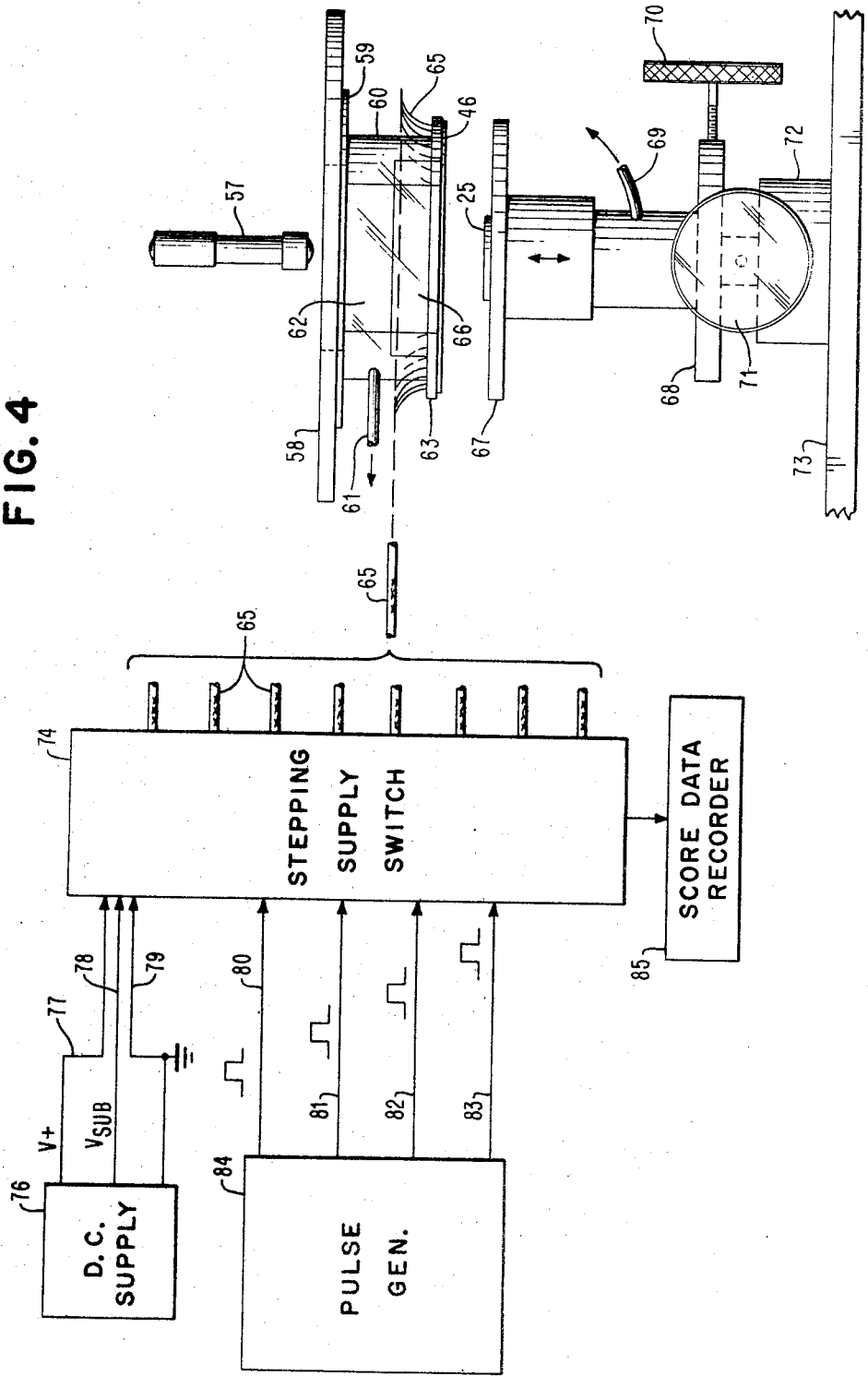
FIG. 4 is a diagrammatic showing of a test system associated with a third form of pneumatic probe for testing circuitry arranged on a wafer to be tested by a pneumatically driven probe diaphragm.

In summarizing an explanation of the present invention, it may be noted that it is illustrated in connection with several varieties of pneumatic pressure devices for bringing a probing array of printed circuit probe points into contact with a small microminiaturized array of electronic devices such as diodes, transistors, or integrated circuits, many of which may be arranged in an orderly fashion in rows and columns on a small semiconductor material wafer. The problem solved is that of bringing a great number of probing points into contact with a multiplicity of terminals closely confined, and yet bring all of these points into contact with a firm and evenly distributed type of pressure and also the type of pressure and impact suited to break any oxide or dirt film on the tiny areas. The flexible plastic probing diaphragms of these showings are specially suited for the purpose because they may be transparent and thus subject to visual registration between the probing circuit and the circuits to be tested. Moreover damage to such wafers is avoided because the pneumatic control is subjected to variation according to the size, material and nature of the wafer. In any event, the probing pressure applied is firm and evenly distributed and in all cases makes up for the irregularities of the wafers and the testing apparatus. The printed circiut art work on the probe diaphragm is arranged to complement that of the circuit to be tested. In other words, if the circuit to be tested has hard, rough, granular terminal area metal, then the probe terminals may be formed of a soft, smooth, projecting nature; and the inverse is true if the circuit to be tested comprises leads and terminals of comparatively soft metal such as deposited aluminum, and such aluminum may be rather smooth but with an oxide coating formed by weathering, then the probe art work may be best calculated to provide hard, granular probe point areas.

Referring to FIG. 1, it is noted that a plastic bag 27 is wrapped around and suspended from an upper frame member 29, which is usually a circular metal or glass plate, and a lower ring or hoop 32 around the lower surface of which the plastic material is stretched across the surface 26 to form a substantially horizontal area of thin, flexible deformable material. Inside the lower part of the bag 27 and adhesively attached to the inside of the horizontal portion 26 there is assembled an insulation block 35 which carries the ends of a series of depending wires 34 which radiate from a small area at the lower end wherefrom they project slightly as indicated at 37. Although shown as single wire 34, it will be realized that each indication 34 may comprise a whole series of fine wire brought together to be closely spaced at the lower point 37 whereby they are opposite circuitry upon a wafer 25 which is supported on a pedestal 33 which is moveable up and down to bring it either in touch with the projections 37 or directly under the portions extending at 37.

The upper ends of the single wires 34 or groups of wires 34 are extended through insulation mountings 30 and into separate cables 31 where they may be radiated out and directed into apparatus for sending and receiving the testing impulses which course downward and upward through the conductors 34 once contact is established between the lower end of the probe bag 27 and the elevated wafer 25.

According to the nature of the circuitry or components on the wafer 25, preliminary contact may be established by raising the pedestal 33 directly into contact with the probing wire ends 37 after preliminary registration. However, in other instances where a more vigorous type of impact contact probing action is required, then the pedestal is raised short of direct contact and a pneumatic action is relied upon to provide further impact especially in those cases when it is desired to penetrate the kind of terminals on the wafer 25 which are liable to have imperfections such as a layer of dirt, grime, or oxide. In order to provide this pneumatic pressure, or impact, the plastic bag 27 is provided with an air inlet 28 through which a desired amount of pressure may be exerted to expand the bag 27 and thus push it downward relative to the frame 29 which is ordinarily fixed; and the downward movement will cause the entire lower portion 26 of the plastic probe to descend and cause an even pressure to be exerted all across the probing surface so that any irregularities in the nature of the wafer, probe or the pedestal will be compensated for by the flexibility of the bag 27, the lower portion 26 and the supports for the wire 35 which bring the probing ends 37 into firm contact all over the top of the wafer 25 where the terminal areas are arranged to coincide with the exending wire ends 37.

Here again it may be noted that the preliminary steps of separation or non-separation of the wafer and the probe and the type of air pressure or hammer blow provided is tailored to suit the conditions and it is easily realized that this may be varied according to the type and strength of the wafer and the kind of circuitry to be tested.

Another variation which may be employed in connection with FIG. 1 is that instead of the solid wires and projecting ends 37 shown in FIG. 1, there is the alternative wherein the plastic bag 27 may be provided with an exterior printed circuit arrangement and the lower horizontal portion 26 may also carry such printed circuit down into the probing area where the printed circuit terminals are arranged to extend slightly and be hardened and also be arranged symmetrically to coincide with the terminal areas of a large number of components or integrated circuits formed on the wafer 25. Although as a usual thing, the component elements or circuitry arranged on such a wafer 25 are arranged in regular rows and columns of course it will be realized that this is optional, and any type of arrangement may be provided, providing that the probing circuitry points coincide therewith and form a sort of mirror image of the terminal areas so that when they are brought together there will be registration between the terminals of the wafer and terminals of the probe.

Turning now to FIGS. 2 and 3, there is shown a second modification of a probing device having some of the attributes of that shown in FIG. 1 and in addition thereto having other characteristics giving it other advantages. A U shaped frame 42 is shown as having a base portion 55 and an upper horizontal arm carrying an air chamber 43. This chamber 43 is formed with a hollow opening 54 at the bottom of which there is secured a plastic diaphragm 36 also shown in FIG. 3 in plan view. The plastic diaphragm 36 is to be made of a rather thin Mylar plastic which is about ¼ of a mil in thickness and corresponds in purpose and use to the horizontal portion 26 of the plastic bag shown in FIG. 1. An air inlet supply and cut-off valve 44 is shown in FIG. 2 in communication with the air chamber 54 and it is in there that the pneumatic pressure may be exerted to push the diaphragm 36 downward into contact with the top surface of the wafer 25 which is to carry a large number of components or integrated circuits arranged in a regular array. Assuming that such a regular array is to be formed in a vertical line, then the underside of diaphragm 36 is arranged with printed circuitry as shown in FIG. 3 where the inner critical area 38 is shown to have a large number of closely spaced terminals or probing points. These terminals coincide with the actual terminals of the wafer 25 upon which the circuitry or components formation such as diodes or transistors are to be tested by the impulses coming into the probe area FIG. 3 as guided by the leads or conductor lines 39 which radiate out from the inner probe area 38 to the outer terminal areas 40 where wires such as 41 in FIG. 2, may be connected to act as the input and output pulse conductors for the testing pulses.

A vertically adjustable support for the wafer 25 is provided in the form of a toggle pedestal 51 which has an adjustable screw 52 and a knob 53 thereon which is suited to be manipulated to raise and lower the top 50 of the pedestal upon which there is placed the wafer registering base 49 carrying a series of registering pins 47 which are fitted into openings 45 formed in the underside of the air chamber 43. The wafer support 49 has an upper removeable shoulder plate 48 upon which the wafer is secured in a centralized position so as to register exactly with the probing printed circuit so that the area 38 is in accurate register as a mirror image of the terminal areas of the circuitry on the top of the wafer 25.

Here again, the probe testing procedure followed is that of placing the wafer 25 on the slightly lowered pedestal and then adjusting the pedestal upwardly optionally either close to the underside of the diaphragm probe sheet 36 or in contact therewith and then provide the air pressure for direct and firm and evenly applied contact across the entire matching printed circuitry of the wafer array and the probe and meanwhile have testing pulses coursing in and out of the wires 41 and the radiating printed circuitry conductors 39. Here also, as in connection with the other probe device modifications, the arrangement of air inlet control 44 is designed to permit variation according to the nature of the wafer to be tested, i.e., a slow firm input of air pressure, or a percussive or staccato style of air pressure application according to the nature of the wafer and according to the nature of the films, elements, components or circuitry theron, and also in accordance with the cleaned or oxidized nature of the metal of the terminal areas. In the usual arrangement of circuitry, the wafer 25 will bear element films or circuitry of the kind wherein the terminal areas are of a relatively soft metal such as aluminum, molybdenum, or gold and, on the other hand, the probing terminal circuitry especially at the probe points where contact is desired such as at the inner part of the area 38 shown in FIG. 3, there the probe points would be usually of a copper underlying printed circuit formation with the critical areas further plated with gold and then topped with a relatively hard plating material such as rhodium which is also of a rough, granular exterior appearance which serves ideally for a kind of percussive impact contact to penetrate through any dirt or oxide on terminal areas and established a very good electrical connection between the test probes and the circuitry which is supposed to receive the pulses necessary to do the testing and yield output electrical effects indicative of the good or bad or ineffective nature of each active and passive elements on the wafer.

As a more definite indication of the parameters employed in connection with FIGS. 2 and 3, it may be noted that each of the probe areas in area 38 are approximately 5 mils across in area and separated by a spacing of 4 mils. It is also pertinent to note that the Mylar diaphragm 36 may be of a thickness of ½ to 2 mils or substituted therefor there may be other plastics or flexible sheeting. The kind of air pressure to be applied through valve device 44 is usually of the range of 2-10 pounds per square inch.

From the foregoing consideration of FIGS. 1, 2, and 3, it will be noted that the test probe apparatus and methods considered is used for testing a large number of devices or circuits on a semiconductor wafer 25. It is to be understood that the wafer may bear a large number of similar fabricated elements or electronic film components formed on the wafer and arranged in a rectangular array in rows and columns, such components to be later divided and used separately or, on the other hand, the components may remain in position as parts of a single or a plurality of integrated circuits. In either case, there will be terminal areas to and from the element connected in the integrated circuit portions. As shown in connection with the diaphragm probe sheet of FIG. 3, a single line of probe terminals are extending to be registered with a similar mirror image of single line terminals on the wafer 25. It is further understood that such a line may be a single shot test probe or such an arrangement in a central area 38 may have the probe points insulated from the remainder of the radiating circuitry and thus be prepared to be stepped column by column or row by row across a wafer area having a plurality of series of test points to be considered.

The circuit connector or probe shown in FIG. 1 comprises a plastic bag 27 which may be of Mylar and carry either very fine wires 34 or printed circuit conductors thereon and have a land pattern of extending wires or etched portions of the printed circuit extending from the lower part of its surface. The conductors connect the land pattern to the cable connectors 31 which in turn are connected to a pulsing device and analyzer. The land pattern is a mirror image of the metallized lands of all devices on the wafer 25. The plastic bag 27 carrying the probe circuitry is firmly stretched and secured around the top to the frame 29 which may be metallic or plastic and also transparent when the occasion demands such transparency. At the lower portion, the bag is also stretched and secured to the circular ring 32 with the lower part 26 stretched in a horizontal position above the wafer. Frame portions 29, 32, and 35 are provided to hold the probe land pattern in registration with the circuitry on the wafer. The wafer 25 is placed on the pedestal 33 and registered in position thereon and then the pedestal is raised to bring the wafer terminal areas near or in contact with the probe points. Then the plastic bag is pressurized so that a uniform contact pressure is provided at each land area on the wafer before test pulsing is initiated.

It is seen that one application of the devices of the present invention is for the testing of the characteristics of electronic elements and connecting conductors scattered over the surface of a small wafer of semiconduction material. These probes are also suited for use in thin film devices where the substrate is an insulator, instead of a semiconductor wafer. Essentially the means shown are provided for the purpose of connecting to or probing a large number of contact areas which are very close together or very small on the order of mil size or smaller. The contact areas are usually on the same plane. However, there are ordinarily slight surface irregularities and in the present instance, these are taken care of by the pneumatic pressure approach as well as by the selective insulation of the probing circuitry so that only the probing points or contact areas protrude and other portions are insulated by either a plastic cover or deposits of insulation material such as silicon monoxide. It is to be understood that the input/output cable and wire connections 31 and 41 of FIGS. 1 and 2 carry the power supply potential and test pulses into and out of the devices to detect the good and bad portions thereof and record the position of each.

Hereinbefore, we have considered two different types of electrical contact probes as shown in FIGS. 1 and 2. Now turning to FIG. 4 and observing the showing of a third form of apparatus on the right hand side of FIG. 4, it will be noted that this particular apparatus is shown in connection with a pulse generating and stepping system shown at the left in FIG. 4.

There are many points of similarity between the types of apparatus shown in FIGS. 1 and 2 and the more sophisticated form shown at the right in FIG. 4. All of the varieties involve the use of an pneumatic actuator for pressing a flexible diaphragm or bag upon a circuit to be tested.

At the top, FIG. 4, it is noted that a microscope 57 is provided for observation and alignment of the probe diaphragm and the circuitry below it on the semiconductor wafer or substrate. Associated with the microscope 57 is some sort of illumination (not shown) to aid in the use of the optics of the system. At the top of the apparatus is a horizontal plate 58 which is understood to be attached to some adjustable vertical support and this plate is either hollowed out at the center or formed entirely of glass to be transparent so the observation may be made directly through the vertical line under the microscope 57. Mounted underneath plate 58 is a shield 59 which is also of a transparent glass or plastic material. Directly beneath shield 59 is an air chamber 60 which is preferably formed by Plexiglas but, however, it could be of any other plastic or metallic material which is easily formed to provide a hollow inner chamber 62 which is reached by an air inlet tube 61 to provide the pneumatic pressure desired for distending a diaphragm as to be explained hereinafter. Fastened within the lower recess of the air chamber 60 is a shoulder ring 63 which is formed with an inner circular opening 66 and an outer flange 64 which carries a complete array of input/output wires 65 arranged to come into the shoulder in an insulated form and protrude through the shoulder 64 vertically with exposed wires, the lower ends of which protrude to establish outer peripheal contact with corresponding radiating wires on the Mylar diaphragm 46 which is cemented to the bottom of the mounting flange 64.

Figure 5:
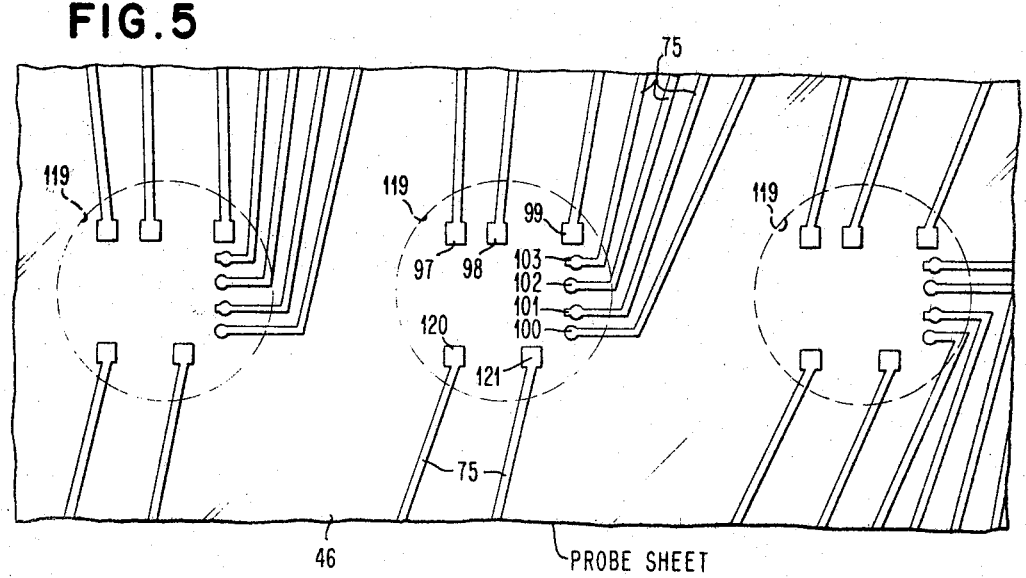
FIG. 5 is a detailed view showing a portion of the probe diaphragm bearing the probing printed circuit terminals and radiating lines.

It is understood that the mounting ring 63 is assembled within the lower part of the air chamber 60 and securely attached thereto so that the entire structure is air tight so that any pneumatic pressure applied through inlet 61 is applied downward through the circular opening 66 and evenly applied across the critical surface of the Mylar diaphragm 46, the lower surface of which is provided with a plurality of microcircuits, an enlarged showing of a few of which are represented in FIG. 5.

Figure 6:
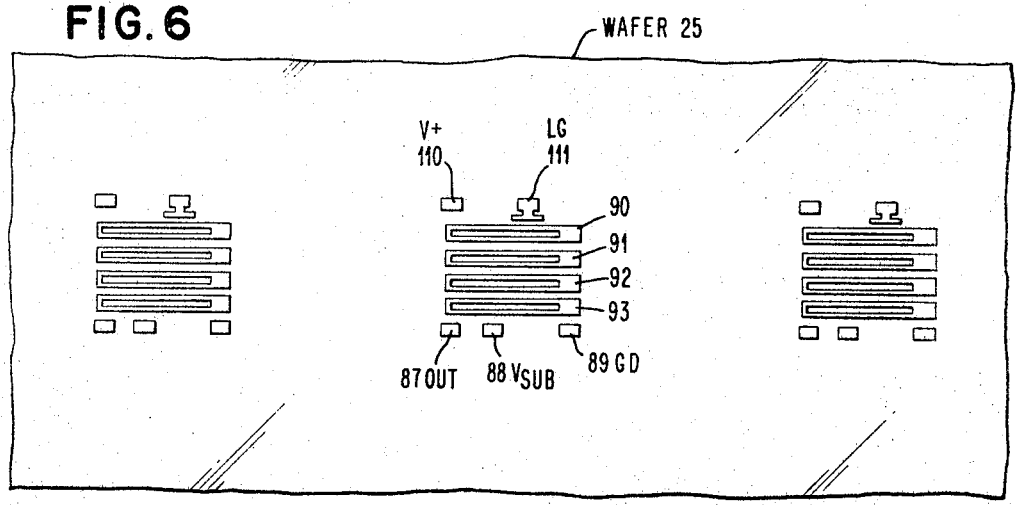
FIG. 6 is a detailed view of a portion of a supporting semiconductor wafer bearing a series of logic circuits to be tested. It will be noted that the terminal areas of the three circuits shown are mirror images of the patterns of the terminal areas of the probing circuitry shown on the diaphragm of FIG. 5.

Referring again to the apparatus in FIG. 4, it is seen that directly beneath the diaphragm 46, there is placed in a horizontal position a semiconductor wafer 25 also formed with active elements and circuitry of what is shown representatively here as a plurality of NOR circuits a few of which are illustrated in FIG. 6. Turning again to FIG. 4, it will be realized that wafer 25 is the work piece or part of the apparatus to be tested and it is placed horizontally on top of the enlarged platform or pedestal 67 of a vacuum chuck which holds it firmly in position and ready to be adjusted by the compound slide 68 holding the vacuum chuck. An exhaust tube 69 is the vacuum control inlet for optionally holding the wafer 25 while testing is in the process and releasing when it is desired to remove the wafer from the test apparatus. Returning to consideration of the compound slide 68, it is noted that a pair of $x$ and $y$ positioning knobs 70 and 71 are arranged to be manipulated to shift the vacuum chuck in a micropositioning fashion so that the wafer and its circuitry may be adjusted relative to the diaphragm 46 as observation by the microscope 57 takes place with the operator watching to see that the probe points are aligned with the terminal points of the corresponding mirror image circuitry on the wafer before the air inlet 61 is supplied with pressure to bring the lower surface of the diaphragm 46 in a firmly and evenly distributed form of contact with the top surface of the wafer 25. The compound slide 68 is mounted on a lower block 72 which is secured to a supporting base 73.

The ring 63 may be made of metal which is screwed to the bottom of the Plexiglas chamber 60 and the lower shouldered portion 64 may be of a plastic, such as Plexiglas, with the input/output wires 65 projecting therethrough in an insulated fashion. Instead of direct contact by the lower end of the wires 65, there may be provided small attachment wires which are to be soldered between the end tabs on the diaphragm 46 and the terminal pins on the air chamber as part of the wires 65 which radiate out to the control apparatus. The large vacuum chuck platform 67 which is on the micromanipulator base holds the wafer 25 during the test and it also extends outward to prevent the diaphragm 46 from ballooning out and rupturing under pressure.

A thin film resist is applied over discrete areas such as all areas surrounding area 119, FIG. 5, to insulate all except the critical probe areas by a coating such as KTFR which electrically insulates the connecting wiring 75 on the diaphragm 46 from shorting to the wafer under test or the vacuum chuck metal platform. The probe points or terminal areas such as areas 97–99 and 100–103, FIG. 5, are plated up to extend approximately $\frac{1}{10}$ mil above the insulation 119 on the connecting wiring to provide positive contact to the test points. Contact resistance for the probes is low, in the order of $\frac{1}{4}$ to $\frac{1}{2}$ ohm per contact when about 5 lbs. per square inch of air pressure is applied behind the diaphragm 46.

Figure 7:
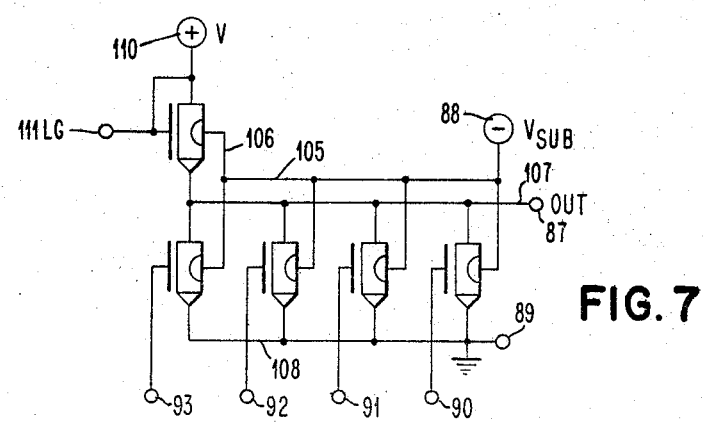
FIG. 7 illustrates a circuit diagram showing the test connections, elements, and the circuitry of a NOR circuit of the type shown in multiple on the wafer of FIG. 6.

Before proceeding to describe the entire operation of the apparatus in the system of FIG. 4, it is believed well to refer to the cooperation between the probe diaphragm, FIG. 5, and the integrated circuitry shown in FIGS. 6 and 7 as illustrative of the kind of microcircuitry which may be probed by the novel apparatus of the invention. It is assumed as shown in FIGS. 6 and 7 that the wafer circuitry to be tested is series of similar integrated NOR circuits with as many as nine contact areas per circuit. In the center of the showing of FIG. 6 is one actual appearance of a multiunit semiconductor apparatus which is also represented diagrammatically below in the circuit diagram of FIG. 7. The particular type of transistor shown as repeated five times in this one integrated circuit, is the form known as an insulated gate field effect form of transistor. In this style of device, the wafer 25 may be a treated semiconductor material of the p type with certain restricted areas associated with the various terminals being of the n type coated by certain of the aluminum terminal areas to provide drains, gate, source and circuitry terminals as shown, D.10,850. For the present purposes, it may be assumed that the reference characters shown in FIG. 6 correspond to the reference characters shown in FIG. 7 as designating the various input and output terminal portions. In FIG. 7, the device represented by 110, 111LG, 106 and 107 is designed as a load resistance in this circuit. Points 110 and 111LG are positively biased in a manner in which the device forms a non-linear load. Point 106 is the normal negative substrate potential and point 107 is the source supply of the non-linear load as well as the circuit output terminal. The several transistors are grounded through wire 108 and over to the grounding terminal 89. Separate input terminals for pulsing are represented by terminals 90–93 which go severally to the separate portions associated with each transistor and the corresponding drain outlets are connected to wire 107 which has an output terminal 87. Now referring up to FIG. 6, it is seen that a corresponding array of terminals 87–93 and 110, 111 are arranged around three sides of the single integrated circuit. This same formation is shown above in FIG. 5 in a mirror image array so that when the diaphragm 46 is turned upside down and placed in register with the circuitry of FIG. 6, there will be registration between an area such as probe area 100 with circuit terminal area 90, and a probe area 101 with circuit area terminal 91, etc. It is well to point out again that the extreme portions of the probing wiring 75 shown in FIG. 5, i.e., the actual probe end contact points such as ends 97, 98, etc., are slightly raised in the form of an extending probe point so that there is registration and actual provision for indentation of the metallic terminal areas of the integrated circuit of FIG. 6 by the probing points of the diaphragm sheet 46 which may be not only pressed firmly against the integrated circuit but also pressed in a percussive fashion to actually indent the same and do so in a fashion to penetrate any oxides or dirt layers found on the circuit such deleterious coatings being formed thereon between the time of processing and the time of testing. In FIG. 5 it will be realized that the radiating lines 75 passing outwardly to the extremes of the diaphragm 46 are arranged to carry various voltage input and output lines as well as the pulsing controls for testing the different components of one circuit seriatum as shown by the sequencing devices of FIG. 4.

Referring to the testing system shown in FIG. 4, it may be noted that this involves a stepping system within a stepping system. In other words, the switching device 74 is designed to jump from one integrated circuit to another as shown left to right in FIG. 6. This is done by selecting cables 65 in sequence, each of said cables involving a plurality of lines directed into the lines such as the printed circuit lines 75 shown grouped in association with each set of probe points in FIG. 5. And than, FIG. 4, within each of said groups of lines 75 and cable wires 65, there is a set of wires such as 80, 81, 82 and 83 which are pulsed sequentially by the pulse generator 84 which in effect then tests for example the probe points 90, 91, 92, and 93 in FIG. 6 to sense out the characteristics of the four transistors associated with the central integrated circuit illustrated in FIG. 6. Referring back to FIG. 4, it is seen that in each of the main stepping operations, there is also utilized the potential supplies from the D.C. supply device 76 which has a series of lines such as 77 which is the positive voltage line, line 78 which is the negative substrate voltage line, and line 79 which is the grounding line for all of the stepping cables as well as the grounding line for the D.C. supply device 76. The several cables 65 of FIG. 4 not only carry pulse input and the voltage level lines over to the probing device but also carry back such lines as a line out of the output terminal 87 shown in FIGS. 6 and 7. This line comes back to the device 74 and passes through to the score recorder device 85 which may be in the form of a recording oscillograph or other output data recorder to indicate which of the several devices of each circuit are good or bad and identify them according to the probe timing of the several pulses passing through lines 80 to 83.

Before proceeding to outline further the advantages and mode of operation of the various probing devices, it is believed well to go into detail regarding the manner in which the circuitry is placed upon the diaphragm 46 of FIG. 5. Although other flexible and transparent plastics may be used, it was found that a Mylar film of about ¼ mil or thicker was suitable for the purpose and may be clad on both sides with about ½ ounce of electrolytically deposited copper. This corresponds with .0007 of an inch in thickness of copper. The reason for coating both sides is to put a temporary coating on the inside of the diaphragm which is not used for the probing but which imparts a greater degree of stiffness to the plastic temporarily while it is being processed.

The foregoing electroplating step may be regarded as the first step in an art work procedure for preparing a diaphragm by a whole series of steps which may be outlined in the following paragraphs step by step.

(2) A resist KTFR may be applied to the outer surface while the copper clad Mylar is rotating on a plate spinner. After application of either resist, the piece of Mylar is baked thoroughly at 120° F. for about 30 minutes.

(3) A photographic positive (i.e., opaque where probe and line exist) is then exposed over the sensitized piece. It is noted that the probe pads are the same size, shape and placement as the wafer test points and this insures accurate alignment on the wafer.

(4) In the case of the use of the KTFR, there is development with KMER followed by spraying the exposed area with xylene for 5 to 10 seconds to further develop the photoresist image. All of this is followed by baking the developed piece for 20 minutes at 120° F. to drive off solvents still present in the resist.

(5) Activate and clean bare copper areas on the piece with copper pre-kleen to remove surface oxides prior to plating. Plate the piece with 24 karat acid gold for a time duration that will allow approximately $3/10$ mil plating build-up. During this step, it is well to insulate the bare copper on the back of the work piece to keep it out of the plating solution.

(6) After plating, remove the piece from the Plexiglas sheet and strip the exposed KTFR from the work piece. When the KTFR is completely removed, reattach the piece to the Plexiglas sheet and tape the edges with waterproof tape.

The foregoing five steps may be performed by following an alternative procedure as outlined in (2') to (6') below:

(2') Apply Shipley AZ 1350 positive resist to one surface of the copper and bake.

(3') Using a photographic positive (same as the original), expose pattern, then develop in Shipley AZ developer and bake.

(4') Etch the pattern side of work piece in ferric chloride. The pattern is completely etched and any touch-up etching by hand may now be accomplished.

(5') Strip AZ 1350 resist from the work piece using acetone which does not affect the Mylar.

(6') Electroplate the piece with 24 karat acid gold for 5 minutes at 100 ma. The original diaphragm art work has an outer peripheral contact ring temporarily established there to provide contact for electroplating leads.

The remaining steps are common to both procedures:

(7) Etch the copper from the pattern side of the work piece using ferric chloride etchant and wash carefully with water when completely etched and dry thoroughly.

(8) Place the work piece, still taped to the Plexiglas board, on a plate spinner. Apply the KTFR again, rotate, and bake in the oven at 120° F. for 30 minutes.

(9) Expose a probe window mask directly over the probe areas. The probe window is a square opaque area which will allow all portions of the diaphragm surface to polymerize except over the probes.

(10) Develop the piece using KMER developer. It is now evident that the interconnection lines are completely insulated by the hardened KTFR while the extending probe areas are uncovered.

(11) Using a Selectronic gold plating solution, brushplate the probe areas for 5 minutes at 1 volt. A cotton tipped electrode saturated with plating solution is readily useable. Wash thoroughly with water when complete so as to remove all traces of plating solution.

(12) Rhodium plate the probe areas with Selectronic rhodium plating solution the same as in the foregoing step. Reduce the time of plating to 3 minutes and apply it at 1.5 volts. Voltage readings are more appropriate than current readings due to the nature of the rush plating operation.

(13) Remove the work piece from the Plexiglas sheet and mount in a large open centered phenolic frame. This outer frame is large enough so that the workable part of the diaphragm is entirely inside the outer periphery of the frame. The pattern lies as much as ½ inch inside. The work piece is glued printed side outward on the frame using Pliobond cement and it is set for one hour.

(14) Cover the printed circuit surface of the work piece with a thin Plexiglas sheet and use waterproof tape to seal the Plexiglas sheet down so as to make it watertight.

(15) Etch the copper backing off the work piece with ferric chloride and thoroughly wash and dry the diapragm, then remove the Plexiglas protecting sheet.

(16) Cement the diaphragm on the metal ring or Plexiglas mounting ring 64 shown in FIG. 4 using Silastic-140 adhesive and allow to set for several hours.

(17) Cut the diaphragm from the phenolic frame i.e., inside the frame, but outside the attached inner ring 64 and the diaphragm is completed with the outer electroplating contact ring removed.

Referring to FIG. 4, it will be noted that the foregoing art work steps are concerned mainly with the formation of printed circuit probing circuitry on the underside of the diaphragm 46 in readiness to be brought into confact with the circuits of the wafer 25. A number of procedural steps are followed with reference to the structure shown at the right in FIG. 4 before the actual probing and recording takes place. To set the devices at the proper distances, the wafer 25 is placed on the vacuum chuck 67 and an adjustment is made by either raising the chuck or lowering the supporting plate 58 so that between the uninflated diaphragm 46 and the wafer 25, there is a spacing of approximately 10 mils. Then observation is made through the microscope 57 and adjustment of the position of the wafer 25 is carried out using the micromanipulator knobs 70 and 71 visually aligning the probe points over the circuit terminal areas on wafer 25 which is to be tested. Such visual manipulation is easily accomplished since the microscope will allow one to see through the glass covers and the transparent air chamber and the Mylar diaphragm which is also either translucent or transparent. When the diaphragm test probes and the circuitry terminal areas are fully aligned, the air pressure is applied at approximately 5 pounds per square inch and the connected test system apparatus is pulsed through the cables 65 and to the sets of wires 65 around the air chamber 60. After all of the integrated circuits and the separate elements thereof are sequentially tested, and all are indicated as good or bad on the data recorder 85, then the air pressure is removed and a bleeder (not shown) allows the air to escape from the air chamber.

A shift in position of the position of the diaphragm may be made to align with either another row or column of devices on the wafer before the foregoing steps are repeated for another set of testing operations.

Although illustrated in connection with the testing of a row or column of components at a time, it is realized that the same sort of structure is applicable also should a single active element or components or single integrated circuit be tested at a time or, on the other hand, a multiple array of vertical or horizontal devices as shown is subject to testing of a single element at a time or, alternatively a whole two dimensional array may be sensed simultaneously and probing be established all over the whole surface and indications of the results of such testing could be read out simultaneously into different indicators.

In all three of the variations, FIG. 1, FIG. 2, and FIG. 4, it is obvious that the models provide for the testing of a plurality of probe points simultaneously. There is also avoidance of vibration of the contacts at the probe points and since the probes move in quite close to a vertical direction, visual alignment is easily established. Once alignment is established automatic step and repeat testing of the semiconductor wafer or integrated circuits follows automatically through the system devices shown at the left in FIG. 4.

From the foregoing description of apparatus and methods, it is apparent that there is provided here satisfaction of the need for a high speed electrical test probe capable of probing many tiny contact areas simultaneously on the surface of an integrated circuit, chip, wafer, or module. The flexible transparent probe may be fabricated with as few or as many contact probe areas as desired. Basically, it is a printed circuit on a flexible drum like diaphragm surface that is forced into contact with an integrated device to be tested by air pressure on the back of the diaphragm. The drum head nature of the flexible circuits not only lends the probe area to evenly distributed and applied pressure but it also lends itself to the desired nature of percussive action required to break through any oxide or extraneous coating formed on circuit terminal areas. The probe contacts of the probe printed circuit on the diaphragm may be arranged as exact duplicates and mirror images of the corresponding terminal areas of the integrated circuit contacts and therefore aid in the alignment and subsequent contact between the two matching points. The diaphragm circuitry is ideal for input signals and power supply voltages to be applied to the test circuit an output signals therefrom are detectable from the circuit and through the mesh contacts when the diaphragm is pressurized. Of course, prior to the application of pressure, the contacts of the diaphragm are aligned optically and in a novel fashion with the terminal probe areas of the integrated circuit to be tested.

It is well to note that the circuitry shown in FIGS. 5 and 6 is greatly enlarged and the actual size of one of the integrated circuits, three of which are shown in FIG. 6 is actually encompassed within an area which is only a square of $\frac{1}{32}$ of an inch on each side. Therefore, each circuit terminal area or separation thereof is gauged to be in a portion of mils or fractions or mils and accordingly the probe areas are correspondingly small and microscopic.

The particular diaphragm 46 shown in FIG. 5 is arranged to test the integrated NOR circuits, and the diaphragm probe points are mirror images of those circuit areas actually appearing in FIG. 6. As an example of the usefulness of circuitry using NOR logic, we may refer to the IBM Patent 3,075,093 issued on Jan. 22, 1963.

In FIG. 5, as denoted by the outline 119, it is illustrated that the entire diaphragm circuitry is usually insulated except for the window area 119 through which the probe points protrude. The covering is by means of a polymerized KTFR which is an insulator. This insulates the conductors on the diaphragm from any other conductor material that the diaphragm may contact on the wafer or the wafer platform or chuck. Actually the surface of the probe contact areas is raised by first plating with gold and then with rhodium for hardness to the extent that they protrude a few tenths of a mil beyond the surface of the surrounding insulation. This slight protrusion of the contacts assures substantial contact pressure and low contact resistance.

Various tests were performed with different thicknesses of the diaphragm wherein its was found that increasing the thickness of the diaphragm usually required a higher degree of air pressure up to approximately 10 pounds per square inch when the diaphragm was raised to a thickness of 2 mils. Then there were also tests wherein the rhodium hardened probe points were brought into contact with the various terminal metals of the integrated circuits. Tests diaphragms were used to contact silicon wafers upon which aluminum, molybdenum, and molybdenum gold combinations (first molybdenum then gold plating) had been evaporated to thicknesses in the range of 10,000–20,000 A. Contacts probing to the metal on all wafers were 100% and of very uniform resistance with about 5 pounds per square inch air pressure. It was found that graph indications of contact resistance vs. line resistance produced uniform slopes for the three different types of metallic wafers. Line resistance was judged to be in the range of 1 ohm which was found from the graphs and the displays that the contact resistance was very small compared to the 1 ohm resistance. Another indication of this was the uniformity of slope obtained with different pairs of contacts on different wafers. There was very little difference in slope in the graphical illustrations between the aluminum, molybdenum and combined molybdenum gold testings. The slight differences noted may be attributed in part to the difference in conductivity of the bulk materials and also explained qualitatively as a difference in the resistance of the metal films that were contacted due to a difference in their thickness as illustrated in the following table:

| Film Type | Film thickness | Resistance |
| --- | --- | --- |
| Mo-Au | {20,000 A. Mo / 15,000 A. Au | }Lowest. |
| Mo | 18,000 A. Mo | Lower. |
| Al | 10,000 A. Al | Low. |

Both of the factors of conductivity and thickness could be the cause of slight differences in resistance of the various metallic films and since all of the graph slopes for any one film type are extremely parallel, there is reason to believe that the actual contact resistance is small. The maximum and minimum slopes of graphs were found to correspond to resistances of .79 ohm and 1.05 ohms, respectively, and, therefore, the conclusion is drawn that the contract resistance is either small compared to .26 ohm or extremely uniform.

Testing revealed that relatively thick and inflexible Mylar diaphragms are to be avoided. Some testing was done on an aluminum pattern on a wafer and in the terminal areas of the aluminum film small pits were found which were the result of repeated probing and they were observed on some contact terminal areas and not on others. A correlation was established between the contacts with no pits and a high resistance contact therein. It was established that certain test Mylar sheets were too inflexible to allow solid contact at these contact terminals and the remedy was the thinner plastic diaphragm under 2 mils in thickness.

Regarding the pitting of the film metal on circuitry by the hardened probe contact points, it was considered that the indentations were due to slight irregularities present on the surface of the hard rhodium plated diaphragm contacts. The resulting small projecting areas of contact, several for each contact area, resulted in substantial contact pressure at the small areas and actually deformed the underlying metals in the slight degree. Such metal deformation is really advantageous for it ruptures the oxide surface and results in a lower resistance contact.

While the invention has been particularly shown and described with reference to preferred embodiments, it will be understood by those skilled in the art that various changes in form and detail may be made therein without departing from the spirit and scope of the invention.

What is claimed is:

1. In a test probe apparatus for making circuit connections to a microcircuit wherein said microcircuit is present on a substrate bearing at least one of said microcircuits, said microcircuit having terminal areas disposed in a given plane, the improvement which comprises:

a frame mounted adjacent to said substrate;
a flexible bag stretched over said frame and including means for maintaining a portion thereof in a plane extending parallel to the plane of the terminal areas of the microcircuit on said substrate;
a series of conductors mounted on said frame and arranged with projecting probe points extending from the plane of said bag adjacent to said substrate in a pattern coinciding with the pattern of the terminal areas of said microcircuit;
means for inflating said bag to extend said extending probe points into contact with the corresponding terminal areas of the circuitry, said means for maintaining causing said pattern of probe points to be moved uniformly into contact with said corresponding terminal areas of said circuitry.

2. A test probe apparatus of the kind set forth in claim 1 wherein portions of said frame are of transparent material and said bag is of transparent material whereby, prior to the application of inflationary air, visual adjustment may be made between the position of the substrate and the position of the extending conductor probe points of the bag to produce alignment of the contacting terminals before the application of a pressure gas to bring the probe points into forceful register with the circuit to be tested.

3. A test probe apparatus for testing the electronic characteristics of microcircuits with thin closely packed circuit film areas on small thin wafers comprising:

an adjustable support for one of said wafers;
a flexible transparent diaphragm bearing printed probe circuits with probe points matching said circuit areas, said probe circuits having sets of conductors extending from said points to outer terminals on said diaphragm;
each of said wafers bearing a plurality of microcircuits, each of said microcircuits comprising a plurality of component elements represented severally among said sets of conductors on said diaphragm;
a stepping switch with serially selectable cables extending through said testing conductors to said sets of probe circuits on said diaphragm;
a power supplying means associated with said stepping switch connected to said cables serially;
a sequential pulsing means also connected through said stepping switch to be applied serially to said cables and also serially within said cables to be sequenced with regard to separate sets of conductors of the diaphragm for testing separate component elements serially of each microcircuit;
a recording means cooperating with said stepping switch for recording the defective microcircuits and also recording particular defective component elements within each of said microcircuits;
a hollow chamber over said wafer and having at least one transparent side and one open side for receiving said transparent diaphragm with the printed circuit portion facing outwardly towards the microcircuits on said wafer;
means for shifting said wafer and said diaphragm relative to each other while closely spaced to align said probe points over said circuit area; and a pressure fluid medium supply for applying pressure inside said chamber for forcing said diaphragm into contact with the wafer with the probe points pressed evenly on the several circuit areas.

References Cited

UNITED STATES PATENTS

| | | | |
|---|---|---|---|
| 2,622,125 | 12/1952 | Bender. | |
| 2,954,521 | 9/1960 | McKee | 324—72.5 |
| 3,238,455 | 3/1966 | Jankowski | 324—158 |
| 3,319,166 | 5/1967 | Coleman | 324—158 |
| 3,345,567 | 10/1967 | Turner | 324—158 |
| 3,344,351 | 9/1967 | Simonyan | 324—158 |
| 3,405,361 | 10/1968 | Kattner | 324—158 |

FOREIGN PATENTS 917,893  2/1963  Great Britain.

RUDOLPH V. ROLINEC, Primary Examiner

E. L. STOLARON, Assistant Examiner

U.S. Cl. X.R.

29—625, 629; 174—68.5